3,241,980
HIGHER FATTY ACID ESTERS OF HEXAHYDROXYLATED CYCLODODECATRIENE AND THEIR USE IN SALAD OILS

Howard F. Drew, Wyoming, and Willy A. Lange, Cincinnati, Ohio, assignors to The Procter & Gamble Company, Cincinnati, Ohio, a corporation of Ohio
No Drawing. Filed Mar. 19, 1963, Ser. No. 266,226
6 Claims. (Cl. 99—163)

This invention relates to a new composition of matter. More particularly, it relates to a novel composition of matter formed by oxidative hexahydroxylation of cyclododecatriene followed by esterification with higher fatty acid. This invention further relates to low-temperature-stable clear glyceride salad oils containing said novel composition of matter.

It is known that cycloolefinic compounds such as 1,5-cyclooctadiene and 1,5,9-cyclododecatriene can be prepared by polymerization of diolefins with alkyl metal type catalysts. See, for example, U.S. Patent 2,686,209, granted to Reed, August 10, 1954. The synthesis of 1,5,9-cyclododecatriene, in particular, by trimerization of butadiene with titanium halides or alkyl aluminum halides is described in detail in U.S. Patent 2,964,574, granted to Wilke, December 13, 1960.

Of the four theoretically possible stereoisomers of 1,5,9-cyclododecatriene, the two that have been isolated are shown by formula set forth below:

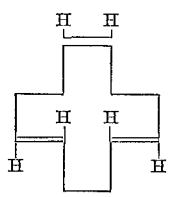

Cis., tr., tr.,
M.P., −18° C.

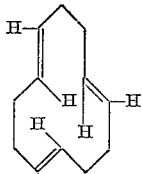

Tr., tr., tr.,
M.P., 34° C.

It will be understood that either of the above or the other isomers (i.e., the cis, cis, tr. and cis, cis, cis isomers), or mixtures thereof, can be utilized in the practice of this invention as described hereinafter to form reaction products with substantially the same properties.

The present invention is directed to the conversion of 1,5,9-cyclododecatriene into derivative compositions of matter which can be dissolved in a clear base glyceride oil to form a superior salad oil having excellent resistance to deposition of high-melting solids at low temperatures.

Oils which are suitable for salad use frequently are stored in refrigerators. The prolonged cooling of such oils to temperatures normally encountered in refrigerators, such as from about 40° F. to about 50° F., generally results in the deposition of crystalline material, usually solid triglycerides, from the oil. This material may appear in the form of a cloud, or as clusters of crystals, and is considered objectionable by the housewife. In general, the tendency to form solid glycerides in oils also adversely affects the suitability of the oil for use in mayonnaise emulsions. Mayonnaise emulsions prepared from such oils tend to be unstable at low temperatures and are easily broken.

Frequently it is desirable to hydrogenate natural vegetable oils, such as soybean oil, in order to improve their oxidative stability. This hydrogenation will tend to raise the melting point and to produce components of decreased solubility, causing the oils to have the undesirable properties described hereinbefore.

A large proportion of the high-melting glycerides can be removed from oils by the process known as "winterizing" in which the oils are carefully cooled to low temperatures for extended periods of time to permit precipitation of solid material. Such solids then can be removed by filtration or other separation procedures. However, in usual commercial practice, not all of the high-melting solid material is removed from the oils by this processing, and the oils still tend to cloud when stored for extended periods of time at sufficiently low temperatures. Moreover, the usual winterizing treatment undesirably tends to remove by entrainment a substantial portion of the olein fraction of the oil.

A primary object of this invention is to prepare a novel composition of matter which can be dissolved in a clear base glyceride oil to form an improved salad oil having excellent resistance to deposition of high-melting solids at low temperatures.

It has now been found according to the present invention that the storage time at low temperatures without clouding can be greatly extended for a given salad oil by dissolving therein from about 0.001% to about 1%, by weight, of crystallization inhibitor which is the composition of matter formed by oxidative hexahydroxylation of cyclododecatriene followed by esterification with higher fatty acid having from about 14 to about 22 carbon atoms.

The cyclododecatriene derivative material of this invention can be conveniently prepared by reaction of 1,5,9-cyclododecatriene with an organic peracid, followed by acid hydrolysis and subsequent esterification with a higher acyl chloride having from about 14 to about 22 carbon atoms. A preferred method of preparation comprises reacting 1,5,9-cyclododecatriene with an excess of peracid, such as peracetic or perbenzoic acid, followed by acid hydrolysis with sulfuric acid and subsequent esterification of the hexaol with the higher acyl chloride having from about 14 to about 22 carbon atoms, such as palmitoyl chloride, in pyridine solvent.

Theoretically, the cyclododecatriene is dihydroxylated at each double bond position in the ring to form the hexaol derivative; and the hexaol is completely esterified to form the hexaester, such ester being specifically 1,2,5,6,9,10-hexaacyloxycyclododecane. In actual practice, however, the final reaction product may comprise a mixture of substances which includes, in addition to said hexaester, other compounds such as partial esters, transannular reaction products, and double ring compounds. It should be understood that all compositions of matter and any mixture thereof formed by the oxidative hexahydroxylation of cyclododecatriene followed by esterification with higher fatty acid having from about 14 to about 22 carbon atoms are contemplated within the scope of this invention, even though the reaction products are referred to herein as hexaesters.

It should be understood that other conventional methods of esterification are contemplated within the scope of this invention, for example, esterification with fatty acid, fatty acid anhydride, and methyl esters of fatty acid.

The crude reaction product formed by said hydroxylation and esterification can be used directly in a clear base salad oil to form a salad oil composition having good resistance to deposition of high melting solids. Or, if desired, the reaction product can be purified; first, by treatment with activated charcoal in methylene chloride; followed by treatment with ethyl alcohol, with retention of the alcohol-insoluble fraction as the most active component. However, during any purification it is desirable to avoid rigorous treatment which tends to decompose the hexaester mixture into products which do not exhibit the salal oil crystal-inhibiting activity described herein.

Although specific methods of preparing the aforesaid hexaols and hexaesters are described herein, it is not intended that the invention should be limited to a particular method of oxidative hexahydroxylation and fatty acid esterification.

The procedure for measuring the resistance of salad oils to clouding and the crystal inhibiting activity of the hexaesters as used hereinafter involves holding the oil or oil with inhibitor at a temperature of about 30° F. until a cloud forms in the oil. As used herein, the term "chill test" is intended to define the length of time, after cooling the oil to 30° F. (unless some other temperature is specified), until such a cloud forms.

A wide variety of oils can be used as base salad oils in the practice of this invention, either individually or as mixtures of oils. Included among suitable oils are the so-called natural salad oils such as olive oil, sunflower seed oil, safflower oil, and sesame oil. Oils such as cottonseed oil and corn oil preferably are given a preliminary "winterizing," de-waxing, or similar other treatment to remove the higher-melting solids to form a good base salad oil. Other oils, such as soybean oil, may require some hydrogenation to improve resistance to oxidative deterioration with prolonged storage, and the higher-melting glycerides formed during this hydrogenation treatment preferably are removed by winterization. Base salad oils can also be formed by directed, low-temperature interesterification of animal and vegetable fatty materials, followed by removal of higher-melting glycerides formed during the reaction. See, for example, U.S. Patent 2,442,-532, granted to E. W. Eckey, June 1, 1948. Another group of oils includes those in which one or more short-chain fatty acids having from 2 to about 6 carbon atoms, such as acetic and propionic acids, replace, in part, the longer-chain fatty acids present in natural triglyceride oils. Other base salad oils will suggest themselves to those skilled in the art, provided they have a suitable chill test as hereinbefore defined. As used herein, the term "base salad oil" is intended to include any salad oil which will not form solids immediately when cooled to 30° F.

The hexaester and the base salad oil can be mixed together in any convenient manner. For example, the ester in liquid form can be mixed with the oil. If the ester is in solid form, it can be readily dissolved in the oil, although it may be desirable to heat the oil or the mixture of oil and ester to facilitate solution. It is to be kept in mind, however, that in all cases the resulting product is merely a physical mixture and there is no chemical reaction between the ester and the oil.

The following example will serve to further illustrate the invention.

*Example*

To 50 g. of cis, trans, trans-1,5,9-cyclododecatriene which was dissolved in 400 ml. of glacial acetic acid was added with stirring 10 ml. of concentrated sulfuric acid; the solution developed a wine red color. After the final addition of the surfuric acid, the reaction mixture was warmed to 40° C. and the dropwise addition of 30% hydrogen peroxide, 111.6 g., was started; the addition required about 15-20 minutes. Before the hydrogen peroxide addition was completed, an exothermic reaction was occurring which reached its maximum temperature about 40 minutes after the final peroxide addition. By means of the foregoing procedure, peracetic acid was generated in situ in accordance with a preferred method well known to those skilled in the art and described by Fieser and Fieser, Advanced Organic Chemistry, p. 160 (1961). After allowing the reaction mixture to stir overnight at room temperature, it was poured into 1½ liters of hot water (96° C.); the solution was allowed to cool to room temperature while being stirred. The solution was cooled in an ice bath and with stirring was added four 100 g. portions of potassium hydroxide, each portion being added after the previous one was dissolved. The solution was extracted with four 300 ml. portions of chloroform and the extract dried over anhydrous $MgSO_4$. After separation of the $MgSO_4$ by filtration, the extract was concentrated under aspirator vacuum to yield 62.0 g. of hydroxylated product.

Into 200 ml. of pyridine was placed 31.0 g. of the above-mentioned hydroxylated product and 212.5 g. of palmitoyl chloride. During the palmitoyl chloride addition, the solution developed a yellow color and the temperature rose to 50-60° C. After storage of the mixture at 70° F. for 12 hours, it was diluted with 100 ml. of dimethylformamide and poured into 1½ liters of a mixture of ice and water. The two layers were separated and the aqueous portion extracted with three 100 ml. portions of benzene; the extraction tended to form an emulsion which was split by centrifugation. The non-aqueous layer and the benzene extract were combined and the benzene was removed by distillation on a steam bath using a nitrogen sweep to yield 236.4 g. of the desired esterified composition of matter; saponification value found 185.2, saponification value calcd. 198.6; total fatty acid found 86.4%, total fatty acid calcd. 90.4%; acid value found 12.8, acid value calcd. 0; percent acetic acid found 1.7, percent acetic acid calcd. 0. (Calcd. basis: 1,2,5,6,9,10-hexapalmitoyloxycyclododecane.)

When the above esterified composition of matter was dissolved in salad oil consisting of 90% winterized cottonseed oil (refined and bleached) and 10% cottonseed oil (refined and bleached) and held at 30° F., the chill test was extended beyond the 12 hours for the original salad oil without inhibitor as follows:

| Added ester, percent: | Chill test, hours |
| --- | --- |
| 0.025 | 35 |
| 0.05 | 58 |
| 0.1 | 153 |

A 5 g. portion of a similarly prepared esterified composition of matter was added to 250 cc. ethyl alcohol at 34° F. to yield 1.7 g. of an insoluble material which settled out and had the following analysis: saponification value 165.9, acid value 28, total fatty acid 96.3%, hydroxyl value 27.2.

Solution of 0.1%, by weight, of said alcohol-insoluble material in the above base salad oil lengthened the chill test from 12 hours to 240 hours. 0.05%, by weight, of said alcohol-insoluble material in the above base salad oil also lengthened the chill test to about 240 hours.

Perbenzoic acid can be substituted for the peracetic acid in the above example with substantially equal results. When trans, trans, trans-cyclododecatriene is substituted for cis, trans, trans-cyclododecatriene in the above example, substantially similar results also are obtained.

Other hexaacyloxycyclododecanes containing acyl radicals having from about 14 to about 22 carbon atoms, such as myristoyl, stearoyl, and behenoyl, can be prepared in the manner described above by using equivalent amounts of the appropriate acyl chloride. When from about 0.001% to about 1%, by weight, of at least one of said hexaacyloxycyclododecanes is dissolved in a base salad oil such as winterized cottonseed oil, peanut oil, and soybean oil, comparable improvements in chill test are obtained. If too large an amount of inhibitor is present, it will be precipitated out of the oil as the oil-inhibitor mixture is cooled and possibly even promote crystallization of high-melting solids in the oil. Too small an amount of inhibitor, of course, will be relatively ineffective. Amounts of ester in excess of about 1%, by weight, are unnecessary as affording no significant added improvement of the oil; and it is preferred to use about 0.1%.

It will be understood that the esterified composition of matter of this invention is not limited to its use as a salad oil crystal inhibitor. The crystal inhibiting activity of the composition of matter suggests that it can also be used as a salad oil crystal modifier whereby it will materially improve the filtration of high-melting solids from the salad oil during conventional "winterizing" treatments.

What is claimed is:

1. Higher fatty acid esters of hexahydroxylated cyclododecatriene containing fatty acid groups having from about 14 to about 22 carbon atoms.

2. A clear glyceride salad oil having improved resistance to deposition of high-melting solids and comprising a base salad oil having dissolved therein from about 0.001% to about 1%, by weight, of higher fatty acid esters of hexahydroxylated cyclododecatriene containing fatty acid groups having from about 14 to about 22 carbon atoms.

3. The clear glyceride salad oil of claim 2 in which the higher fatty acid is palmitic acid.

4. The clear glyceride salad oil of claim 2 in which the base salad oil is derived from cottonseed oil.

5. The clear glyceride salad oil of claim 2 in which the esters are hexaesters.

6. A clear glyceride salad oil having improved resistance to deposition of high-melting solids and comprising a base salad oil derived from cottonseed oil having dissolved therein about 0.1%, by weight, of the ethanol-insoluble higher fatty acid esters of hexahydroxylated cyclododecatriene containing fatty acid groups having from about 14 to about 22 carbon atoms.

References Cited by the Examiner

UNITED STATES PATENTS

| | | | |
|---|---|---|---|
| 2,435,626 | 2/1948 | Gooding | 99—118 |
| 2,437,648 | 3/1948 | Milas | 260—617 |
| 2,500,599 | 3/1950 | Bergsteinsson et al. | |
| 2,964,574 | 12/1960 | Wilke | 260—617 |
| 3,026,357 | 3/1962 | Scott | 260—617 |

A. LOUIS MONACELL, *Primary Examiner.*